UNITED STATES PATENT OFFICE 2,153,700

PREGNANONE COMPOUNDS AND A METHOD OF PRODUCING THE SAME

Arthur Serini, Berlin, and Lothar Strassberger, Berlin-Wilmersdorf, Germany, and Adolf Butenandt, Danzig-Langfuhr, Free City of Danzig, assignors to Schering Aktiengesellschaft, Berlin, Germany, a corporation of Germany No Drawing. Application September 9, 1935, Serial No. 39,804. In Germany September 12, 1934

24 Claims. (Cl. 260—397)

The present invention relates to the manufacture of unsaturated keto-containing compounds of the pregnane series, which are designated as pregnenones, and relates in particular to the production of such unsaturated keto-containing compounds of the pregnane series which possess a keto group at the carbon atom 3. A further substituent may be present in the side chain of the unsaturated pregnane compounds at the carbon atom 20, and in particular there may be present at such place a second keto group or a secondary alcohol group, or a group which with the aid of hydrolysis or the like, can be converted into a secondary alcohol group, such as a secondary O-acyl- or O-alkyl group.

The unsaturated keto-containing compounds of the pregnane series, with whose manufacture the present invention is concerned, correspond to the general formula $C_{21}H_{30}OX$ and the structural formula

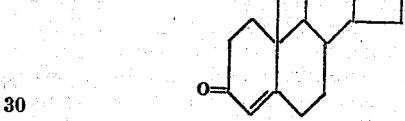

wherein $x$ represents ketonic oxygen ($=O$) or HOH, or a group which can be converted with the aid of hydrolysis into HOH, for example, $$\diagup H$$
$$\diagdown O\text{—acyl}$$

We have found that these unsaturated keto-containing compounds of the pregnane series may be obtained by causing a quantity of halogen to act upon the corresponding saturated keto-containing compounds requisite for the formation of monohalogeno compounds, and splitting off hydrogen halide from the so formed monohalogeno compounds.

Our starting materials include pregnandiones 3, 20, and other similar compounds may be used which contain a keto group in ring I of the molecule, and also those wherein the side chain is capable of being transformed into the —CO.CH₃ configuration. Such latter compounds are, for instance, the pregnanol-(20)-ones-(3) or their hydroxyl derivatives containing a group which on hydrolysis is transformed into the hydroxy group, such as the esters, ethers and the like. These compounds are transformed in the same manner as described above into the corresponding mono-halogen substitution products, which then may if desired be oxidized to the mono-halogen diketones; of course, in the case of the hydroxyl derivatives the hydroxy group is to be re-established before oxidation takes place. From said mono-halogen mono- and diketones hydrogen halide is then split off so as to yield the corresponding unsaturated pregnenones.

To produce the unsaturated ketones, we may also proceed in such a manner that, for instance, the esters of said pregnanolones are first halogenated, whereupon a double bond is established in the molecule by splitting off hydrogen halide; the unsaturated esters are then saponified to the corresponding unsaturated hydroxy ketones, the pregnenolones, which can be readily oxidized to the pregnendiones, either directly or after protection of the double bond by saturation with halogen.

The following structural formulas serve to illustrate the invention. In these formulas R represents either the hydroxy group or a group which upon hydrolysis is converted into the hydroxy group, such as the O-acyl, O-alkyl, O-aryl, and other groups, while Hal indicates halogen.

isomeric pregnenolones and pregnendiones according to the following formulas:

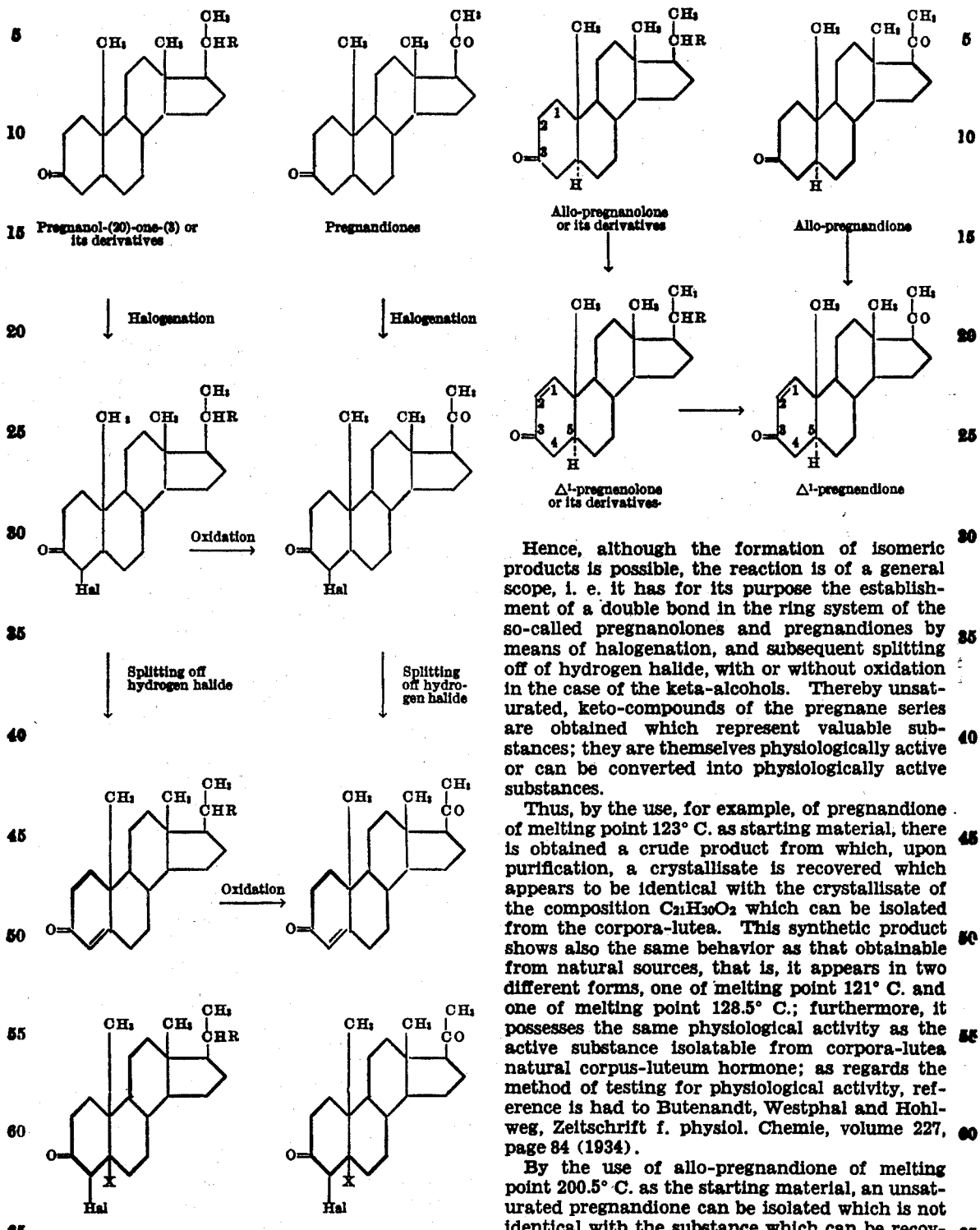

Hence, although the formation of isomeric products is possible, the reaction is of a general scope, i. e. it has for its purpose the establishment of a double bond in the ring system of the so-called pregnanolones and pregnandiones by means of halogenation, and subsequent splitting off of hydrogen halide, with or without oxidation in the case of the keta-alcohols. Thereby unsaturated, keto-compounds of the pregnane series are obtained which represent valuable substances; they are themselves physiologically active or can be converted into physiologically active substances.

Thus, by the use, for example, of pregnandione of melting point 123° C. as starting material, there is obtained a crude product from which, upon purification, a crystallisate is recovered which appears to be identical with the crystallisate of the composition $C_{21}H_{30}O_2$ which can be isolated from the corpora-lutea. This synthetic product shows also the same behavior as that obtainable from natural sources, that is, it appears in two different forms, one of melting point 121° C. and one of melting point 128.5° C.; furthermore, it possesses the same physiological activity as the active substance isolatable from corpora-lutea natural corpus-luteum hormone; as regards the method of testing for physiological activity, reference is had to Butenandt, Westphal and Hohlweg, Zeitschrift f. physiol. Chemie, volume 227, page 84 (1934).

By the use of allo-pregnandione of melting point 200.5° C. as the starting material, an unsaturated pregnandione can be isolated which is not identical with the substance which can be recovered from the corpora-lutea but is isomeric therewith. Physiologically it is without any activity, even with 1 mg in the Clauberg-test. Nevertheless it may find use as intermediate product for the manufacture of substances having physiological activity.

When pregnanol-20-one-3 is used as the starting material for the present process, there is obtained a pregnenol-20-one-3 which can be converted by oxidation into the pregnendione which Of course, when subjecting isomeric pregnanol-(20)-ones-(3) or pregnandiones, such as the so-called allo-compounds, wherein the rings I and II in the molecule are arranged in trans-position to each other, to the process of this invention, the halogen becomes attached to the 2-carbon, and accordingly on dehalogenation the double bond is not established in 4.5-position, but is positioned between the carbon atoms 1 and 2 so as to yield is identical with the substance obtainable from corpora-lutea. Instead of the free hydroxy ketones, their derivatives can be employed as starting materials; thus, we may start from their esters or other similar compounds in which the hydroxyl group is intermediately converted for protection, prior to the action of the halogenating agent, into a group which can be reconverted into a hydroxyl group with the aid of hydrolysis; compare, for example, Houben-Weyl, Methoden der organ. Chemie, vol. 3, second edition (1923), page 1 et seq.; and vol. 2, second edition (1922), page 511 et seq.

The following examples serve to illustrate the invention without, however, limiting the same to them:

*Example 1*

To a solution of 1 gram of pregnandione-3,20 in 50 cc. of chloroform there is added at 0° C. a solution of 0.5 gram of bromine in 20 cc. of chloroform while stirring vigorously. The chloroform is evaporated in a vacuum. The residue is boiled with 10 cc. of pyridine for 12 hours under reflux. Thereupon the reaction mixture is poured into dilute sulfuric acid and is extracted with ether. The ethereal solution is washed with soda solution and water whereupon the ether is evaporated. The residue obtained yields on further purification by recrystallisation, pregnendione-3,20 of the general formula $C_{21}H_{30}O_2$ which by its physiological activity as well as by its analysis and chemical properties proves to be identical with the crystalline mass which can be isolated from the corpora lutea of ovaries. It occurs in two modifications, the one melting at 121° C., and the other at 128.5° C. both modifications being readily transformable into each other. The transformation is effected, for instance, by selecting suitable solvents or solvent mixtures. Thus, using water-free methanol, for instance, yields the high melting modification. The same product is obtained by resolidification of the molten compound while recrystallisation from alcohol-water mixtures always forms mixtures of the two modifications. The low-melting product may be obtained by evaporating a solution in an alcohol-water-ether mixture by means of an air current.

*Example 2*

2.05 grams of pregnandione-3,20 are dissolved in 30 cc. of glacial acetic acid, thereto 10 drops of a hydrobromic acid-glacial acetic acid solution and drop by drop 3.2 cc. of a bromine-glacial acetic acid solution (equal to 1.05 molecules of bromine) are added at 15-20° C. while stirring. Immediately on dropping in the bromine solution decolorization takes place. The reaction product is precipitated by the addition of water, is filtered off and recrystallized, if desired, from alcohol and subsequently from dilute acetone. Thereby it forms fine needles of a silk-like luster, having a melting point 186-187° C. (with decomposition) and corresponding to the general formula $C_{21}H_{31}O_2Br$. Thereupon the pure or crude product as obtained after precipitation with water, is heated in about 30 times its weight of water-free pyridine under reflux to boiling for about 15 hours, the solution is poured into water, the pyridine is neutralized by means of dilute sulfuric acid and the solution is extracted with ether. After evaporation of the ether there remains the unsaturated diketone, pregnendione-3,20 of the general formula $C_{21}H_{30}O_2$ which on recrystallisation or the like purification process corresponds to the active material of the same composition isolatable from the corpora-lutea, and to the product obtained according to Example 1. Its dioxime melts at 244° C. (with decomposition).

*Example 3*

850 milligrams of allo-pregnandione-3,20 of the melting point 200.5° C. are dissolved in 32 cc. of glacial acetic acid; to this solution there are added 10 drops of a mixture of hydrobromic acid-glacial acetic acid and 1.27 cc. of a bromine-glacial acetic acid solution containing 1 mol of bromine. The reaction solution immediately decolorizes at room temperature. The monobromo allo-pregnandione of the formula $C_{21}H_{31}O_2Br$ is precipitated by means of water and yields on recrystallization from alcohol and dilute acetone, needles of the melting point 199° C. (with decomposition).

150 milligrams of said product are heated for 5 hours at 175–185° C. with 5 cc. of a 21% solution of potassium acetate in glacial acetic acid. The reaction product is poured into water and extracted with ether. The ethereal solution is washed with soda solution and with water whereupon the neutral portion of said ether extract is distilled at a high vacuum (0.001 mm. Hg). At 80° C. part of the substance sublimates and yields crystals which after recrystallisation from dilute alcohol show a melting point of 140° C. and an optical rotation value in alcohol of $$[\alpha]_D^{23°} = +68.6°.$$

The $\Delta^1$-allo-pregnendione-3,20 exhibits in the ultraviolet an absorption at about 235 mu as is characteristic for $\alpha,\beta$-unsaturated ketones. It is not identical with the active product obtainable from corpora-lutea but isomeric with it.

While the bromination of the allo-pregnandione takes place just as simply and readily as that of the pregnandione, the monobromo allo-pregnandione differs from the isomeric brominated pregnandione by the feature, that hydrogen bromide can be split off from the former only with difficulty. However, on heating the bromo compound with potassium acetate in glacial acetic acid solution, as described in this example, the $\alpha,\beta$-unsaturated diketone $C_{21}H_{30}O_2$ is obtained. Of course, other dehalogenation methods may be employed, their suitability being first established by simple preliminary experiments.

*Example 4*

1.5 grams of pregnandione dissolved in 100 cc. of carbon tetrachloride is treated drop by drop, while cooling, with 50 cc. of a solution of chlorine in carbon tetrachloride and containing 0.35 gram of chlorine. After standing for some time, the carbon tetrachloride is evaporated in a vacuum, and the residue is heated with about 20 times its weight of anhydrous quinoline for 15 hours to about 150–160° C. The further working up occurs as in Example 1, there being likewise obtained pregnendione-3,20, with the properties of the active material obtainable from corpora-lutea.

*Example 5*

7.1 grams of pregnanol-(20)-one-(3) are dissolved in 100 cc. of glacial acetic acid, to which solution there is added drop by drop a solution of 1.02 molecules of bromine in 12.5 cc. of glacial acetic acid, i. e. a 4 n bromine solution. On keeping the reaction mixture at room temperature it is decolorized after about 5 minutes. The reaction product is precipitated with water, filtered off and recrystallized from alcohol and from dilute acetone. The brominated pregnanolone forms fine needles having a silk-like luster and melting at 185° C. (with decomposition).

550 milligrams of the brominated pregnanol-(20)-one-(3) are heated to boiling for 12 hours with 8 cc. of anhydrous pyridine. The reaction solution is worked up as described in Example 7 below. The $\Delta^{4-}$ unsaturated pregnenolone obtained crystallizes from pure alcohol in characteristic prisms, and from dilute alcohol in needles, the melting point being 159° C. (uncorr.), the optical rotation in absolute alcohol $$[\alpha]_D^{20°} = +89.7.$$

Example 6

The acetate of allo-pregnanol-(20)-one-(3) is brominated as described in Example 5 by means of bromine in glacial acetic acid. The acetylated monobromo compound is then saponified at room temperature with the calculated amount of 0.05% alcoholic potassium hydroxide solution and yields the monobromo-hydroxy-ketone which may be worked up as above described.

Example 7

A solution of 0.197 gram of chlorine in 30 cc. of chloroform is added, while stirring and cooling, to a solution of 1 gram of the acetate of pregnanol-20-one-3 in 50 cc. of chloroform. After evaporating the chloroform the residue is heated with 10 cc. of quinoline for 3 hours to 150–180° C. Thereupon it is poured into dilute sulfuric acid and extracted with ether. The residue obtained on evaporating the ether is heated with 25 cc. of 1% alcoholic potassium hydroxide solution for 2 hours. After cooling it is poured into water, extracted with ether and after evaporation of the latter, the residue is recrystallized from alcohol and there is thus obtained pregnenol-20-one-3 of melting point 159° C.

Example 8

500 mgs. of pregnanol-(20)-one-(3) acetate are dissolved in 4 cc. of glacial acetic acid. To this solution 6 drops of a glacial acetic acid-hydrobromic acid mixture and, drop by drop, at 20° C. 0.7 cc. of a bromine-glacial acetic acid solution containing 1.05 molecule of bromine are added. Immediately decolorization of the bromine solution takes place. When the reaction is completed, the reaction product is precipitated by means of water and is recrystallized from alcohol. It crystallizes in colorless needles of the melting point 167° C.

310 milligrams of the brominated acetate are heated with 5 cc. of anhydrous pyridine for 14 hours to boiling. The reaction solution is then concentrated by evaporation, neutralized with dilute sulfuric acid and extracted with ether. After drying the ethereal solution and evaporating the ether, an oily residue is obtained which is purified by dissolving it in a little alcohol and causing it to crystallize by cooling and rubbing with a glass rod. On recrystallisation from dilute alcohol the acetate of the unsaturated hydroxy ketone is obtained in needles having a melting point of 138.5° C.

It is saponified by 1% methyl alcoholic alkali lye to the unsaturated hydroxyketone pregnenol-20-one-3 of the melting point 159° C.

Of course, many changes and variations may be made in the reaction conditions described in the above given examples. Thus, for instance, instead of the pregnandiones and pregnanolones mentioned, their isomers may be used as starting materials. Likewise, instead of the acetates of the pregnanolones described, one may subject other hydroxyl derivatives to the process claimed, for instance, other esters, such as the benzoate, the phthalate, the succinate and the like, or ethers or other compounds wherein the hydroxy group is substituted.

Furthermore also derivatives of the keto group may be employed, for instance, those, wherein the keto group of the pregnandiones and pregnanolones is reacted with typical ketone reagents as semicarbazide, thiosemicarbazide, phenylhydrazine, hydroxylamine and the like.

The halogenation of these starting materials may be carried out not only in glacial acetic acid or in chloroform, carbon tetrachloride and the like, but also in other organic solvents which are not substantially affected by halogen may be used likewise.

The conversion of the esters or ethers of the halogenated pregnanolones into the hydroxy compounds is effected by the known methods of saponification or hydrolysis. See, for example, Houben-Weyl "Methoden der organischen Chemie", 2nd edition, vol. 2, page 511 et seq.

The splitting off of hydrogen halide in order to establish a double bond in the ring system is achieved not only by the reagents mentioned in the examples, as treatment with pyridine bases or with alkali acetates in glacial acetic acid, but also other reagents may be used such as, in general, treatment with alkaline agents or the like, and likewise the halogenation may be effected in known manner, in suitable solvents as described, for instance, by Houben-Weyl "Die Methoden der organischen Chemie", 2nd edition, vol. 2, page 744 et seq., and 2nd edition, vol. 3, page 789 et seq. (1923).

The oxidation of the pregnanolones is carried out in the manner described in the copending application Serial No. 34599 relating to Unsaturated pregnanolones and pregnandiones and a method of producing the same. Thereby not only chromic acid anhydride may be used as oxidation agent but also other oxidizing agents capable of transforming a hydroxy group into a keto group, such as bichromates in acid solution, alkali and alkaline earth metal permanganates and the like.

The separation and isolation of the halogenated intermediate compounds and the unsaturated end product may be accomplished not only in the manner described in the examples, for instance, by extracting the reaction mixtures with suitable solvents and evaporating the latter, or by precipitating the compounds formed from their solutions by means of water or organic solvents wherein they are insoluble, while the by-products and impurities remain dissolved therein, but also by the use of other methods, for instance, by the formation of insoluble or difficultly soluble condensation products as with the above mentioned ketone reagents.

The purification of said intermediate and end products may be done by fractional and/or repeated crystallisation, distillation, sublimation and the like.

The expression "pregnane series" as used in the claims is intended to mean saturated compounds having the following carbon skeleton:

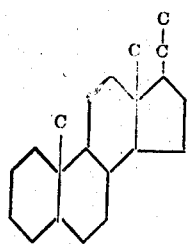

Of course, the amounts of the various agents and the type and the amount of the solvents used in carrying out this invention, the temperatures employed and other reaction conditions may be varied within the limits obvious to those skilled in the art. Hence, many other changes and variations may be made in accordance with the principles set forth herein and in the claims annexed hereto.

What we claim is:

1. The method of producing 3-pregnenones of the general formula $C_{21}H_{30}OX$ wherein X is a member of the group consisting of

and groups which on hydrolysis can be converted into the

group, which comprises subjecting a 3-keto compound of the pregnane series wherein one of two adjacent nuclear carbons is joined to a halogen atom, to the action of a substance which is capable of splitting off hydrogen halide from said compound and thereby creating a double bond.

2. A method of producing pregnendiones, which comprises reacting a pregnandione in which one of two adjacent nuclear carbons is joined to a halogen atom, with a substance capable of splitting off hydrogen halide, and thereby creating a double bond between said carbons.

3. A method for the production of unsaturated pregnanone compounds of the general formula $C_{21}H_{30}OX$, wherein X is a member of the group consisting of

and groups which on hydrolysis can be converted into the

group, comprising reacting a saturated pregnanone compound of the general formula $C_{21}H_{32}OX$ with halogen, and then reacting the monohalogeno compound obtained with a substance capable of splitting off hydrogen halide.

4. A method according to claim 3, wherein the starting material is an allo-pregnandion and yields $\Delta^1$-pregnendiones-(3,20).

5. A method according to claim 3, wherein the saturated starting material is reacted with bromine.

6. A method according to claim 3, wherein the reaction with halogen is carried out in the presence of an organic solvent.

7. A method according to claim 3, wherein the halogen is bromine and hydrogen bromide is split off by treatment with an alkali acetate in glacial acetic acid.

8. The method of producing 3-pregnenones of the general formula $C_{21}H_{30}OX$ wherein X is a member of the group consisting of

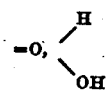

and groups which on hydrolysis can be converted into the

group, which comprises subjecting a 3-keto compound of the pregnane series wherein one of two adjacent nuclear carbons is joined to a halogen atom, to the action of a member of the group consisting of organic and inorganic bases and salts capable of splitting off hydrogen halide from said compound and thereby creating a double bond.

9. A method according to claim 8, wherein the starting material is a pregnanol-20-one-3 and yields a $\Delta^4$-pregnenol-20-one-3.

10. A method according to claim 8 wherein the halogenated compound is obtained by reacting a saturated pregnanone compound with halogen and wherein hydrogen halide is split off by reaction with pyridine.

11. A method according to claim 8 wherein the halogen-splitting agent is an organic base.

12. A method according to claim 8 wherein the halogen-splitting agent is pyridine.

13. A method according to claim 8 wherein the halogenated compound is obtained by reacting a saturated pregnanone compound with bromine and wherein hydrogen halide is split off by reaction with pyridine.

14. A method for the production of $\Delta^4$-pregnendiones (3,20) comprising reacting a pregnandione-(3,20) with halogen, reacting the monohalogeno pregnandione obtained with a substance capable of splitting off hydrogen halide, and isolating the pregnendione so obtained.

15. A method for the production of pregnendiones-(3,20), comprising reacting a pregnanone-(3) compound of the structural formula

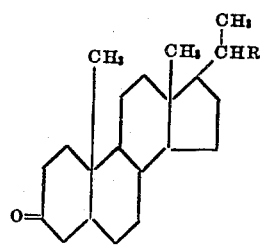

wherein R represents a member of the group consisting of the hydroxy group and groups which upon hydrolysis are converted into the hydroxy group, with halogen, reacting the halogenated compound with a substance capable of splitting off hydrogen halide therefrom, hydrolyzing the product to reestablish the hydroxy group in place of the substituent group R where the latter is not the hydroxy group, and oxidizing the unsaturated hydroxy ketones obtained to transform the secondary alcohol group into a keto group.

16. A method for the production of pregnendiones-(3,20), comprising subjecting pregnanolones to partial halogenation, oxidation of the hydroxy group, and to the action of an agent capable of splitting off hydrogen halide, in any desired order, except that the splitting off treatment takes place after the halogenation.

17. A method according to claim 16, wherein the halogen is bromine.

18. A method according to claim 16, wherein the halogen is bromine and the halogen-splitting agent is an organic base.

19. A method for the production of pregnendiones which comprises reacting a pregnanolon compound of the general formula $C_{21}H_{33}OR$ wherein R represents a member of the group consisting of the hydroxy group and groups which upon hydrolysis are converted into the hydroxy group, with halogen, reacting the halogenated compound with a substance capable of splitting off hydrogen halide therefrom, hydrolyzing the product to reestablish the hydroxy group in place of the substituent group R, where the latter is not the hydroxy group, and oxidizing the unsaturated hydroxy ketones obtained to transform the secondary alcohol group into a keto group.

20. An unsaturated diketone of the cyclopentano phenanthrene series, having the general formula $C_{21}H_{30}O_2$ and the structural formula

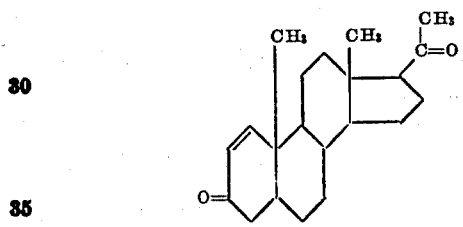

its melting point being at about 140° C., its optical rotation (in alcohol) $[\alpha]_D^{20°} = +68.6°$ and its absorption in the ultraviolet range at about 235 mu.

21. Monohalogeno diketone of the cyclo pentano phenanthrene series, corresponding to the general formula $C_{21}H_{31}O_2Hal$ and the structural formula

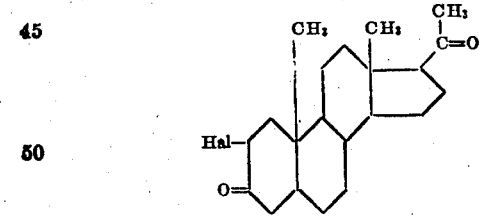

wherein Hal represents halogen, said compound being transformed by treating with potassium acetate in glacial acetic acid solution into $\Delta^1$-pregnendione-(3,20).

22. A halogenated ketone compound of the cyclopentano phenanthrene series corresponding to the general formula $C_{21}H_{31}OHal(Y)$ and the structural formula

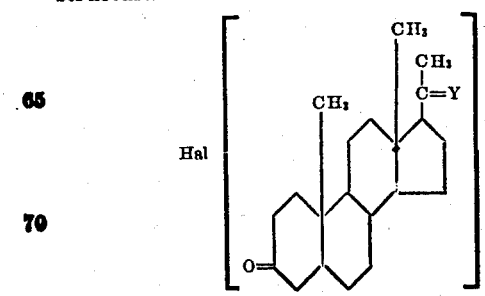

wherein Hal represents halogen taking the place of hydrogen in one of the positions 2 and 4 of the phenanthrene nucleus of the ring system, while Y is a member of the group consisting of O and

R being a member of the group consisting of the hydroxy group and groups which on hydrolysis are transformed into a hydroxy group.

23. An unsaturated ketone compound of the cyclopentano phenanthrene series corresponding to the general formula $C_{21}H_{30}OY$ and corresponding to the structural formula

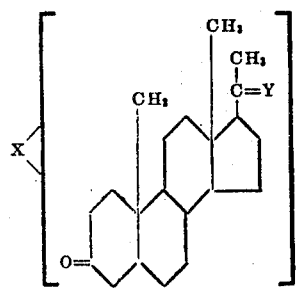

wherein X represents a —C=C— double bond in one of the 1, 2 and 4, 5 positions of the phenanthrene nucleus of the ring system, while Y is a member of the group consisting of O and

R being a member of the group consisting of the hydroxy group and groups which on hydrolysis are transformed into the hydroxy group, and the double bond being in the $\Delta^{1,2}$ position when Y is O.

24. An unsaturated ketone compound of the cyclopentano phenanthrene series, corresponding to the general formula $C_{21}H_{31}OR$ and the structural formula

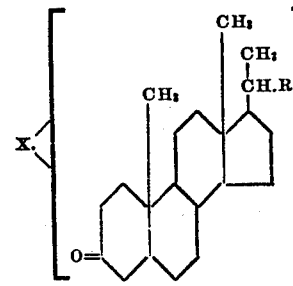

wherein —X— represents one —C=C— double bond in one of the 1, 2 and 4, 5 positions of the phenanthrene nucleus of the ring system while R is a member of the group consisting of the hydroxy group and groups which on hydrolysis are transformed into a hydroxy group.

ARTHUR SERINI.
LOTHAR STRASSBERGER.
ADOLF BUTENANDT.